(No Model.)
I. E. FOLTZ.
PHOTOGRAPH MOUNT.
No. 386,874. Patented July 31, 1888.
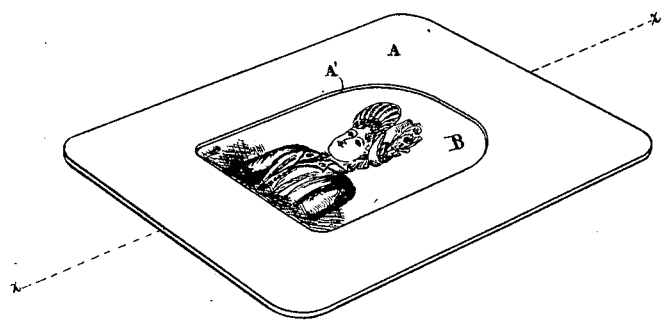
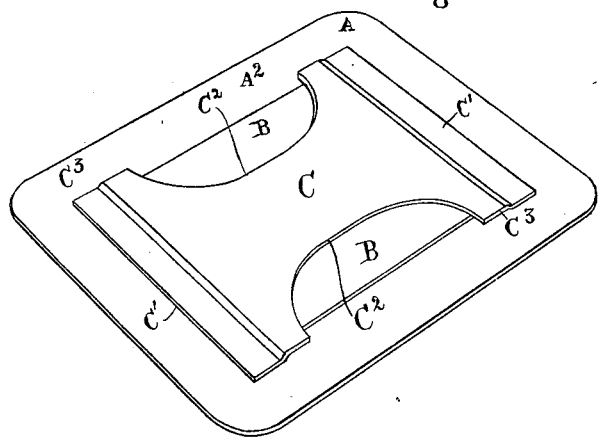
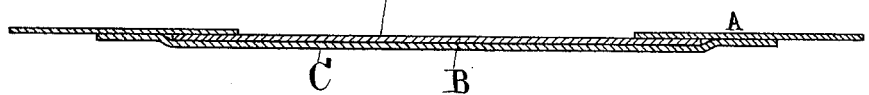
Witnesses:
W. H. Myers.
E. P. Dowling.
Inventor:
Irving E. Foltz,
per L. L. Morrison,
Attorney.

UNITED STATES PATENT OFFICE.

IRVING E. FOLTZ, OF ROCKFORD, ILLINOIS.

PHOTOGRAPH-MOUNT.

SPECIFICATION forming part of Letters Patent No. 386,874, dated July 31, 1888.

Application filed March 8, 1888. Serial No. 266,637. (No model.)

*To all whom it may concern:*

Be it known that I, IRVING E. FOLTZ, a citizen of the United States, residing at Rockford, in the county of Winnebago and State of Illinois, have invented a certain new and useful Improvement in Photograph-Mounts, of which the following is a specification.

This invention relates to improvements in mounts to be used for securing photographs in the openings in album-leaves.

The principal object of this invention is to produce a mount for receiving and holding photographs or other pictures of varying sizes and adapted to secure the same in openings in album-leaves larger than said photographs or pictures.

A further object of this invention is to produce a mount so constructed that a photograph may be quickly and easily inserted therein and withdrawn therefrom without injury to either mount or photograph.

A still further object of this invention is to provide a photograph-mount so constructed that while containing a photograph it may be readily inserted into and withdrawn from the openings in album-leaves without injury to either leaves, mount, or photograph.

The hereinafter-described mount will be found to be especially useful and satisfactory for holding card-size photographs in cabinet-size albums and cabinet-size photographs in panel size albums, and so on.

Referring to the accompanying drawings, which form a part of this specification, Figure 1 is a front isometric view of my improved photograph-mount containing a photograph. Fig. 2 is a back isometric view of the same. Fig. 3 is a sectional view of the mount and photograph through the dotted line $x$ $x$ of Fig. 1.

Like letters of reference indicate corresponding parts throughout the several views.

A represents the front piece of a photograph-mount embodying my invention.

A' represents an opening through the center thereof for displaying photographs.

B represents a photograph in proper position to display the same.

C represents the back piece of the mount, having the ends C' thereof gummed to the front piece, A, and also having the lateral portions thereof cut away at $C^2$, and the remaining lateral portions $C^3$ extending beyond the sides of the photograph B.

Photographs can be inserted in and withdrawn from a mount of the form just described with rapidity and ease without the slightest danger of injury to either photograph or mount. The projecting portions $C^3$ of the back piece, C, prevent the corners of a photograph from coming in contact with the edges of openings in album-leaves while the mount and its photograph are being inserted into or withdrawn from said openings.

To insert a photograph into or withdraw it from the mount, I prefer to hold the former by the portion $A^2$ thereof between the thumb and forefinger of the left hand, and, taking hold of the part B' of the latter with the thumb and forefinger of the right hand, insert or withdraw the photograph, according as it is out of or in the mount.

I claim—

The herein-described photograph-mount, consisting of a front piece having an opening through the central portion thereof for displaying a photograph, and a back piece having the ends thereof gummed to the said front piece, as indicated, and also having the lateral portions of the same cut away, as shown at $C^2$, and the remaining lateral portions $C^3$ thereof extending beyond the sides of the photograph, substantially as described, and for the purpose specified.

IRVING E. FOLTZ.

Witnesses:
GEO. P. PERKINS,
L. L. MORRISON.